United States Patent Office 3,447,330
Patented June 3, 1969

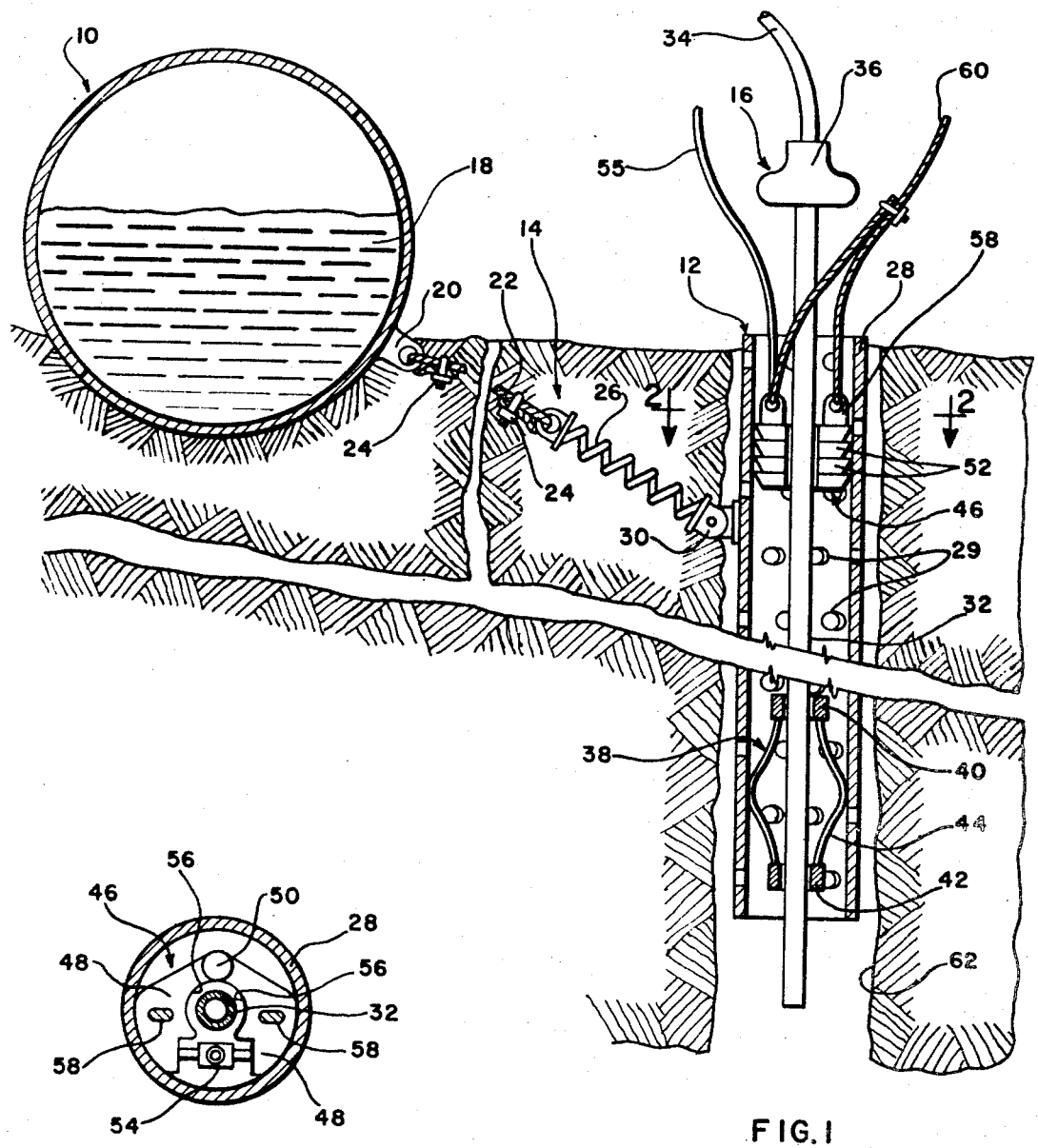

3,447,330
METHOD AND APPARATUS FOR ANCHORING SUBMERGED PIPELINES
Malcolm R. J. Wyllie, Allison Park, Pa., assignor to Gulf Research & Development Company, Pittsburgh, Pa., a corporation of Delaware
Filed Dec. 12, 1966, Ser. No. 600,985
Int. Cl. F16l 1/00, 3/00; E02d 7/24
U.S. Cl. 61—72.3                                    7 Claims

ABSTRACT OF THE DISCLOSURE

A plain double open-ended hollow perforated pipe is jetted into the underwater formation to serve as an anchor while the pipeline, pre-assembled to the anchor pipe at the surface, is caused to be submerged. Thereafter, the pipeline is made to be buoyant, and resilient means are provided in the linkage between the pipeline and the anchor.

---

This invention pertains to a method and apparatus for anchoring underwater pipelines, and is particularly adaptable for use with offshore oil and gas wells to carry the products onshore.

Prior methods of laying pipeline in offshore muds usually comprise weight coating the pipeline to make it negatively buoyant with respect to the muds, and then laying this weighted pipeline into a previously prepared ditch. It is anticipated that the ditch will be covered over due to natural wave action and tides. Digging the ditch is expensive. These prior methods have sometimes proved unsatisfactory in that due to waves, vibration forces coming from various sources, tides, and other disturbing factors, and due to the essentially "weak" nature of the underwater muds, pipelines have risen or have moved up and down, which motion has harmed or even cracked the weight coating and the pipeline. The weight of the pipeline during its operation is a changing factor, in that it will sometimes be carrying heavy liquid products, or light gaseous products, or combinations of these, and this varying weight helps to cause motion of the pipeline. When the pipeline reaches the top of the mud, tidal, wave, and current forces can cause horizontal motion of the pipeline, which could result in damage. Prolonged periods of carrying heavy products can cause the pipeline to sink which can generate large stresses over a long span which also can cause damage. Intermittent slugs of oil and gas can cause vibrations which can cause the pipeline to alternately rise and fall, and which over a period of time will cause the pipe to work its way out of the mud.

These motions of the pipeline first cause breaking off of the weight coating, thus making the pipeline lighter and permitting it to rise to the top of the mud, where it can be subjected to strong horizontal destructive forces.

The method of the invention comprises using a positively buoyant pipeline, and fixing this pipeline to an anchor in the mud by means of a resilient member such as a spring, whereby the pipeline is free to move on its tether and wherein the anchor is insulated from the forces generated by the motion of the pipeline so that the anchor will not work loose. The invention also comprises an improved anchor or piling and method of setting the anchor, comprising an elongated double open-ended pipe which is inserted into the mud by means of a jet of water passing through the anchor pipe. The jet prepares a hole in the mud for the pipe by washing away the mud under the pipe. The piling is also provided with a plurality of relatively small holes in its wall to increase the force exerted by the mud on the piling tending to hold it in place.

In the accompanying drawing forming a part of this disclosure: FIG. 1 is a vertical cross-sectional view through an underwater formation showing the apparatus and methods of the invention; and FIG. 2 is a cross-sectional view taken on line 2—2 of FIG. 1 showing the anchor clamp.

Referring now in detail to the drawing, 10 designates the pipeline being anchored, 12 designates the anchor or pile, 14 designates the connection between the pipeline 10 and the anchor 12, and 16 designates the anchor or pile sinking apparatus.

Pipeline 10 is a conventional hydrocarbon carrying pipeline, usually of continuous welded steel, and is shown partially filled with water 18 to hold it down during the anchor sinking operation, which operation is shown substantially completed in FIG. 1. It will of course be understood that the water 18 is flushed from the pipeline before it is put into use. Many various types of clamps and connectors are commercially available, and therefore a simple perforated lug 20 is shown by way of example.

Connecting means 14 comprises a cable 22, one end of which passes through the opening in perforated lug 20 and is closed upon itself by means of one of a pair of cable clamps 24. The other end of cable 22 is attached by means of the other cable clamp 24 to one end of a spring 26. The strength of spring 26 must be determined for each installation. The spring force needed is the product of the buoyant force times the anchor spacing, since each spring on each anchor will have to resist the buoyant force of that section of the pipeline with which it is associated. If the buoyant force of the pipe is determined when the pipeline is full of air at atmospheric pressure, a safety factor will automatically be built into the installation since in operation there is always some liquid and/or gas under pressure in the pipeline, and hence the buoyancy of the pipeline will be lessened. Thus, the pipeline and the anchor are connected together by resilient, variable length connecting means.

Anchor 12 comprises a length of straight double open-ended pipe 28. The other end of spring 26 is connected to the outside surface of pipe 28 by a welded plate and swivel joint connection 30, or any other suitable means. Double open-ended pipes are used as anchors because of their ease of insertion into the mud, and because they expose a large surface area to the mud to establish a large friction holding force to hold the anchor in place. Pipe 28 is formed with a plurality of relatively small openings 29 spaced over the entire length thereof. Holes 29 increase the hold of the mud on the pipe to reduce the possibility of the pipe working loose.

Depending on the natural environmental conditions, the shear strength of the mud, the size of the pipeline 10, and the products carried, the diameter and length of pipe 28 will vary. However, it is contemplated that pipe 28 will vary between 6 and 30 inches in diameter, and between 10 and 30 feet in length. The shear strength of the particular mud is the single most important factor in determining the size of the anchor, and this can be determined beforehand by sampling.

Apparatus 16 comprises an elongated, hollow fluid jet 32 connected at its upper end to a fluid supply hose 34 by means of a connector and stop member 36. Means are provided to hold jet 32 centralized within pipe 28 during setting of the piling. To this end a centralizer 38 is provided. Centralizer 38 comprises an upper ring member 40 fixed to jet 34 by any suitable means, a lower ring 42 which is somewhat larger than jet 32 so as to be freely moveable with respect thereto for purposes of adjustment, and a plurality of outwardly bent, flat spring members 44 interconnecting upper and lower ring members 40 and 42.

Apparatus 16 also includes means to lead piling 28 off of the lay barge and to guide it during setting, and also to remove jet 32 and centralizer 38 after the anchor is in place. To this end an anchor clamp 46 is provided. Anchor clamp 46 comprises a pair of similar, symmetrically disposed clamp members 48 joined together by pivot 50. Each clamp member 48 is provided with a plurality of teeth 52 to insure tight engagement with anchor pipe 28. Clamp members 48 are interconnected at their outer ends by means of a double acting pneumatic cylinder 54 of any suitable type, which when activated causes the clamp members to swing outwardly about pivot 50 to engage the inside of pipe 28, and which when deactivated causes clamp members 48 to swing inwardly toward each other about pivot 50 to permit free motion of the entire anchor clamp 46 within piling 28. An air supply pipe 55 is provided for activation and deactivation of cylinder 54. Each clamp member 48 is cut out as at 56 to form an opening to permit free passage of jet 32 therethrough. An upstanding lug 58 is provided on the upper surface of each clamp member 48, to which is attached cable 60.

The operation of the invention is as follows:

The depth of the mud will have been determined previously by any well known means, such as a "sparker" survey. The pipeline 10 is joined to anchor 12 via connecting means 14 on board the lay barge. Anchor sinking apparatus 16 is placed into anchor pipe or piling 28 on board the barge. Pipeline 10 is filled with sufficient water to hold it down. The pipe is fed off of the lay barge by conventional means and the anchor and sinking apparatus combination is led down to the mud by means of cable 60, with sufficient slack on supply cables 34 and 55. Fluid, preferably readily available sea water, is fed under pressure through supply line 34 and jet 32 to create a hole 62 into which the anchor and sinking assembly sinks and is guided down via cable 60. The surrounding mud will flow or slough back into hole 62 to tightly surround the anchor shortly after the sinking operation is completed. Jet 32 and piling 28 will sink at the same date due to the resilient interconnection afforded by centralizer 38 via its upper fixed ring 40. When the anchor is set, clamp 46 is released, cable 60 is pulled up, and clamp 46 will rise until it hits the under surface of connector and stop member 36, whereupon continued pull on cable 60 will remove the clamp, the jet, and the centralizer from the sunken anchor. The operator can tell when the anchor is fully sunk by means of the amount of cable paid out and measured.

As shown in the drawing, the connecting means 14 are fixed to the anchor relatively close to the top of the anchor. Thus, the connecting means are easily buried since they are relatively small, since the topmost layer of offshore mud is quite soft, since the anchor will pull the anchoring means down through this soft mud as the anchor sinks, and since this already soft top mud will be agitated and further loosened by the water from the jet returning from the bottom of hole 62.

While the invention has been described in some detail above, it is to be understood that this detailed description is by way of example only, and the protection granted is to be limited only within the spirit of the invention and the scope of the following claims.

I claim:

1. A method of anchoring a pipeline in an underwater offshore formation, comprising the steps of attaching the pipeline to a piling with variable length resilient connecting means, putting the pipeline in the water, flooding the pipeline during the anchoring process with water to reduce the buoyancy of the pipeline, sinking the piling in the offshore formation, and then removing the flooding water from the pipeline.

2. The method of claim 1, wherein the piling is sunk so that its upper end is substantially at the top of the offshore formation.

3. A method of sinking a piling which comprises a straight double open-ended length of pipe open from one end into an offshore formation for anchoring a pipeline below the surface of a body of water, comprising the steps of mounting a fluid jet within said open pipe with its lower end below the lower end of said pipe, supplying fluid under pressure through said jet to create a hole into which said pipe will sink, submerging the upper open end of said pipe during the piling sinking operation, holding the jet substantially stationary wth respect to said pipe, guiding the assembly of said jet and said pipe as the upper end of said pipe is sunk substantially to the top of the offshore formation, releasing said guiding means with respect to said pipe, and removing said guiding means and said jet from said pipe after said pipe is sunken into the offshore formation.

4. In combination, an underwater positively buoyant pipeline, an anchor sunk into the underwater formation, resilient connecting means connecting the pipeline and the anchor, and said resilient connecting means comprising a spring.

5. The combination of claim 4, said anchor comprising a substantially vertically disposed double open-ended length of straight pipe.

6. The combination of claim 5, said anchor pipe being formed with a plurality of relatively small openings formed in the wall thereof.

7. A piling for use in an underwater formation for anchoring a pipeline comprising a plain straight double open-ended length of pipe substantially vertically disposed in said formation, said pipe being of uniform cross-sectional shape throughout with both open ends of said uniform cross-sectional shape, said piling being formed with a plurality of relatively small openings passing through the wall of said pipe along substantially the entire length thereof, at least some of the surfaces in the pipe wall created by said openings being in contact with said formation, whereby the holding force of the formation on the piling is increased.

References Cited

UNITED STATES PATENTS

| | | | |
|---|---|---|---|
| 1,173,355 | 2/1916 | Jones | 61—53.74 |
| 1,409,140 | 3/1922 | Bignell | 61—53.74 X |
| 3,173,271 | 3/1965 | Wittgenstein | 61—72.1 |
| 3,216,203 | 11/1965 | Giraud et al. | 61—72.3 |

EARL J. WITMER, *Primary Examiner.*

U.S. Cl. X.R.

61—46, 53.74